(12) United States Patent
Ogawa et al.

(10) Patent No.: US 8,913,889 B2
(45) Date of Patent: Dec. 16, 2014

(54) OPTICAL MODULE

(71) Applicants: Nippon Telegraph and Telephone Corporation, Tokyo (JP); NTT Electronics Corporation, Yokohama-shi, Kanagawa (JP)

(72) Inventors: Ikuo Ogawa, Atsugi (JP); Ryoichi Kasahara, Atsugi (JP); Toshiki Nishizawa, Yokohama (JP); Yuji Mitsuhashi, Yokohama (JP)

(73) Assignees: Nippon Telegraph and Telephone Corporation, Tokyo (JP); NTT Electronics Corporation, Kanagawa (JP)

( * ) Notice: Subject to any disclaimer, the term of this patent is extended or adjusted under 35 U.S.C. 154(b) by 53 days.

(21) Appl. No.: 13/918,055

(22) Filed: Jun. 14, 2013

(65) Prior Publication Data

US 2013/0336652 A1    Dec. 19, 2013

(30) Foreign Application Priority Data

Jun. 19, 2012   (JP) ................. 2012-137895

(51) Int. Cl.
   *H04B 17/00*   (2006.01)
   *H04B 10/06*   (2006.01)
   *H04B 10/07*   (2013.01)
   *H04B 10/61*   (2013.01)
   *G02B 6/42*    (2006.01)

(52) U.S. Cl.
   CPC ............. *H04B 10/07* (2013.01); *H04B 10/61* (2013.01); *G02B 6/4286* (2013.01); *G02B 6/4214* (2013.01)
   USPC ............. 398/38; 398/203; 398/210; 398/212; 398/214

(58) Field of Classification Search
   CPC ........ H04B 10/60; H04B 10/61; H04B 10/63; H04B 10/66; H04B 10/67; H04B 10/611; H04B 10/614; H04B 10/6161; H04B 10/6162
   USPC ............. 398/25, 33, 38, 82, 86–88, 141, 202, 398/203, 212, 214; 385/15, 27, 31, 39, 48
   See application file for complete search history.

(56) References Cited

U.S. PATENT DOCUMENTS 6,758,607 B2 *  7/2004  Nakabayashi et al. .......... 385/88
7,050,678 B1 *  5/2006  Isono et al. .................... 385/39

(Continued)

FOREIGN PATENT DOCUMENTS

| JP | S63-244005 | 10/1988 |
| JP | H05-333248 | 12/1993 |
| JP | H10-20135  | 1/1998  |
| JP | H11-167048 | 6/1999  |

(Continued)

*Primary Examiner* — Dalzid Singh
(74) *Attorney, Agent, or Firm* — Workman Nydegger

(57) ABSTRACT

An optical module for receiving light according to a digital coherent optical transmission scheme includes two optical fibers, and a monitor PD. The optical signal processing circuit includes a substrate, an optical waveguide layer made up of a core and a clad layer stacked on top of the substrate, and fixtures stacked on top of the clad layer on the one end, and is provided with a light shield member which spans the substrate, the clad layer, and the edge face of the fixture on the edge face of the optical signal processing circuit that faces the monitor PD, and which includes an aperture unit aligned with the given site where the diverted signal light is output.

7 Claims, 12 Drawing Sheets

(56) References Cited

U.S. PATENT DOCUMENTS

| | | |
|---|---|---|
| 2003/0044119 A1* | 3/2003 | Sasaki et al. .................... 385/49 |
| 2003/0053169 A1* | 3/2003 | Nasu et al. .................... 359/133 |
| 2009/0129788 A1 | 5/2009 | Seimetz |
| 2013/0287393 A1* | 10/2013 | Morie et al. .................... 398/38 |

FOREIGN PATENT DOCUMENTS

| | | |
|---|---|---|
| JP | 2001-305365 | 10/2001 |
| JP | 2003-318478 | 11/2003 |
| JP | 2001-133645 | 5/2011 |
| JP | 2011-203377 | 10/2011 |

* cited by examiner

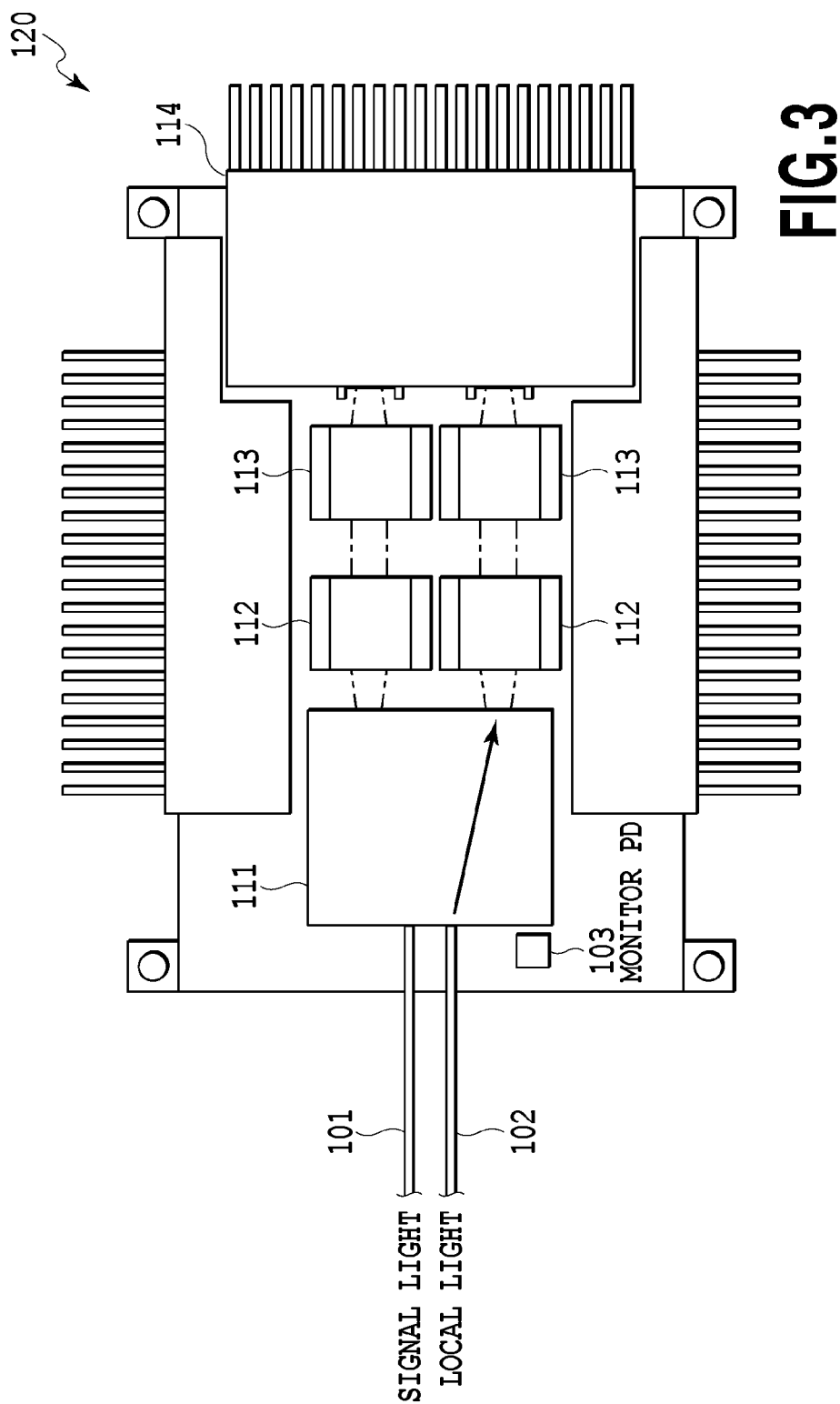

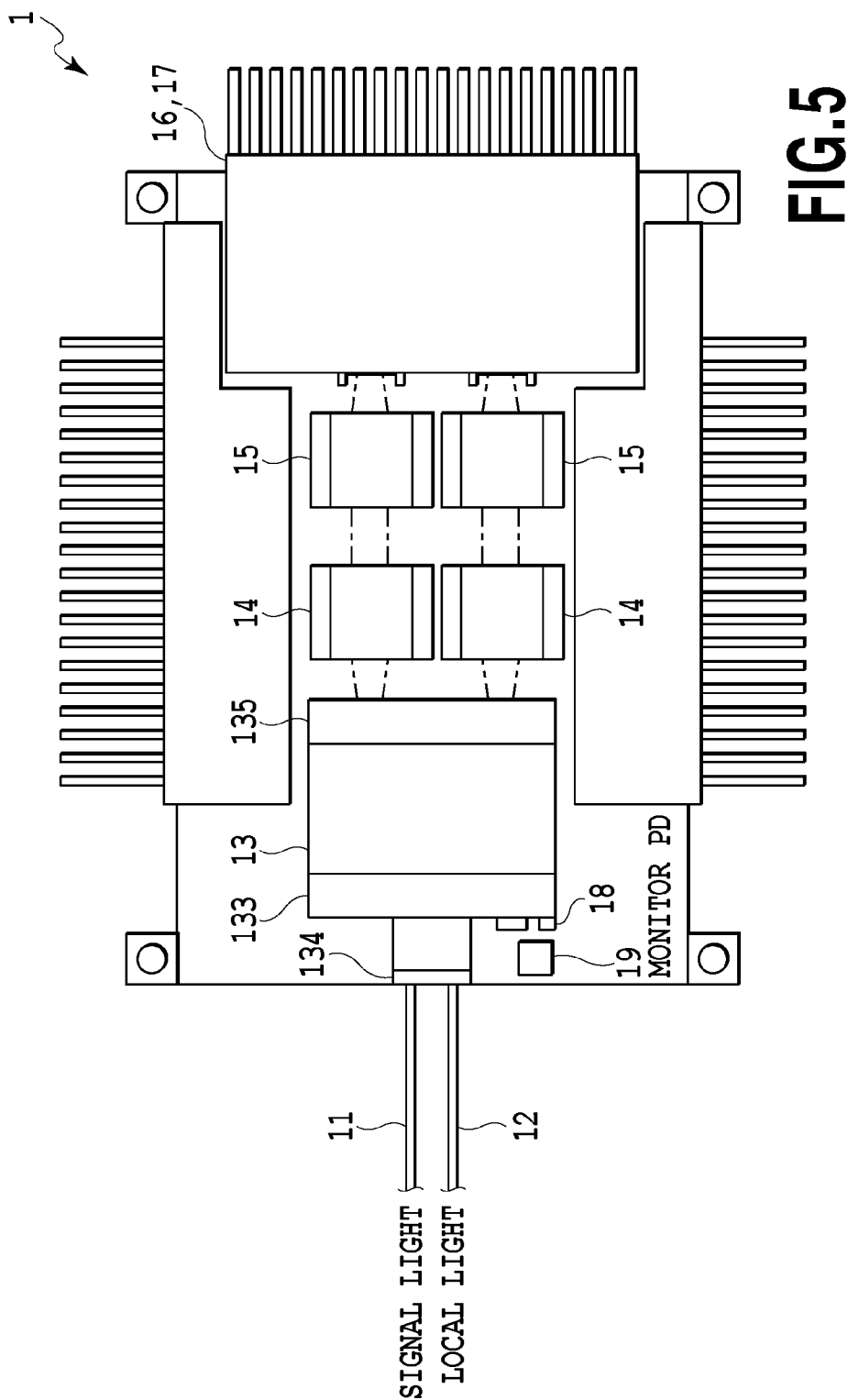

OPTICAL MODULE

CROSS-REFERENCES TO RELATED APPLICATIONS

This application claims the benefit of Japanese Patent Application No. 2012-137895, filed Jun. 19, 2012, which is hereby incorporated by reference herein in its entirety.

BACKGROUND OF THE INVENTION

1. Field of the Invention

The present invention relates to an optical module applicable to an optical receiver that realizes a digital coherent optical transmission scheme.

2. Description of the Related Art

Recently, a variety of optical communication devices are being developed in preparation for the realization of 100 Gbit/s and greater ultra high-speed optical transmission systems in order to achieve greater communication capacity. Optical communication devices utilizing digital coherent technology are attracting attention as optical communication devices used in 100 Gbit/s and greater ultra high-speed optical transmission systems. With digital coherent optical transmission schemes, in order to transmit and receive transmission data using optical interference, signal light is combined with local oscillator (LO) light to demodulate the signal when receiving, and the result is then subjected to digital signal processing. This technique compensates for signal degradation such as chromatic dispersion and polarization mode dispersion due to transmission. Given this background, the development of optical front-end modules for digital coherent receivers is being advanced.

FIG. 1 illustrates an exterior view of an optical front-end module for a digital coherent receiver (also simply called a front-end module or optical module). As illustrated in FIG. 1, the front-end module 100 is provided with two optical inputs (optical fibers) 101 and 102 that respectively input signal light and local light, terminals 106a and 106b that supply power or the like to the module inside the case 104 of the front-end module 100, and output terminals 105 which output the output signals generated by processing the two optical inputs. Since the power of the input signal light is kept at a constant level in the front-end module 100, a monitor PD 103 for monitoring the input optical power is adopted in advance as a necessary component.

In a conventional front-end module, the monitor PD 103 is disposed outside of the front-end module, as illustrated in FIG. 1. In this front-end module, a fiber coupler with a 5% tap rate is provided on the input optical fiber to enable a monitor PD 103 external to the case 104 to monitor the power after splitting the input signal light.

However, with the configuration that provides a monitor PD external to the case as illustrated in FIG. 1, a large area on a board is required, making board mounting difficult. Thus, it is desirable to incorporate the monitor PD into the front-end module.

In response to such demand, there is the configuration illustrated in FIG. 2, in which a monitor PD 103 is built into the case of a front-end module 110. Mounted inside the case of the front-end module 110 are an optical signal processing circuit (dual polarization optical hybrid (DPOH)) 111 made up of a planar lightwave circuit (PLC), optical lenses 112 and 113, and an optoelectronic conversion processor (OE unit) 114 that includes optical semiconductors and electronic circuits. The DPOH 111 processes signal light and LO light respectively input from the two optical inputs 101 and 102. The optical lenses 112 and 113 condense the output light from the DPOH 111. The OE unit 114 optoelectronically converts the condensed light for output as an electrical signal. In the front-end module 110 illustrated in FIG. 2, an output port to the monitor PD 103 is provided on the same edge as the signal light output port of the DPOH 111. With a configuration providing a 5% tap circuit on the DPOH 111, part of the power from the input signal light is output to the monitor PD 103. Such an arrangement is easy given the circuit layout of the DPOH.

SUMMARY OF THE INVENTION

The power of signal light to be monitored by a monitor PD in a front-end module is typically from −20 dBm to 0 dBm. Consequently, it is necessary to precisely sense −33 dBm in the case of a 5% tap. Meanwhile, since the LO light is input at a maximum of +16 dBm, isolation of approximately 50 dB is required between the LO light and the monitor PD. However, with a configuration that provides an output port to the monitor PD 103 on the same edge as the signal light output port of the DPOH 111 as illustrated in FIG. 2, uncoupled light from the LO light produced at the optical input edge of the DPOH 111 is directly incident on the monitor PD 103 as stray light, and sufficient isolation is not obtained. Consequently, there is a problem in that the signal light power cannot be precisely monitored.

Thus, a configuration like that illustrated in FIG. 3 is conceivable. With the front-end module 120 illustrated in FIG. 3, two systems of optics each made up of optical lenses 112 and 113 are used to optically connect output signal light on eight ports from the DPOH to the OE unit, while in addition, an output port to the monitor PD 103 is drawn inside the DPOH 111, with the monitor PD 103 disposed on the same edge as the edge connecting to the input fibers 101 and 102. By taking the configuration illustrated in FIG. 3, the packaging process becomes easy, because it is no longer necessary to dispose the monitor PD 103 in the narrow area from the DPOH 111 to the lenses 112 and 113 or the OE unit 114. Furthermore, it is possible to keep stray light from the LO light produced at the optical input edge of the DPOH 111 from being directly incident on the monitor PD. Consequently, higher isolation between the LO light and the monitor PD 103 can be achieved compared to the configuration illustrated in FIG. 2.

However, even with the configuration in FIG. 3, stray light still reaches the monitor PD 103 by complex paths via reflecting off various components, and thus it is naturally difficult to ensure 50 dB isolation.

An objective of the present invention is to provide an optical module that is able to be used as a front-end module for an optical receiver that realizes a digital coherent optical transmission scheme, and capable of precisely monitoring the signal light power by sufficiently isolating LO light and a monitor PD.

In order to achieve the above objective, an optical module for communication according to an embodiment of the present invention is provided with two optical fibers that respectively input received signal light, and local light used to interfere with the signal light, an optical signal processing circuit, connected to the two optical fibers at one end, that causes the signal light and the local light input from the two optical fibers to interfere, and outputs the result from another end opposite the one end, and in addition, diverts a portion of the input signal light and outputs the diverted portion from a given site on the one end, a signal output unit that optoelectronically converts light output from the other end of the optical signal processing circuit, and outputs the result as one or more output signals, and a monitor PD, disposed on the light path of the signal light output from the given site on the one end of the optical signal processing circuit, that monitors the power of the diverted signal light, wherein the optical signal processing circuit includes a substrate, an optical waveguide layer made up of a core and a clad layer stacked on top of the substrate, and fixtures stacked on top of the clad layer on the one end, and is provided with a light shield member which spans the substrate, the clad layer, and the edge face of the fixture on the edge face of the optical signal processing circuit that faces the monitor PD, and which includes an aperture unit aligned with the given site where the diverted signal light is output.

Further features of the present invention will become apparent from the following description of exemplary embodiments (with reference to the attached drawings).

BRIEF DESCRIPTION OF THE DRAWINGS

FIG. 3 is a diagram illustrating an exemplary configuration of an improved front-end module;

FIG. 5 is a diagram illustrating an exemplary configuration of an optical module adopted as an optical module of the present invention;

DESCRIPTION OF THE EMBODIMENTS

Figure 1:
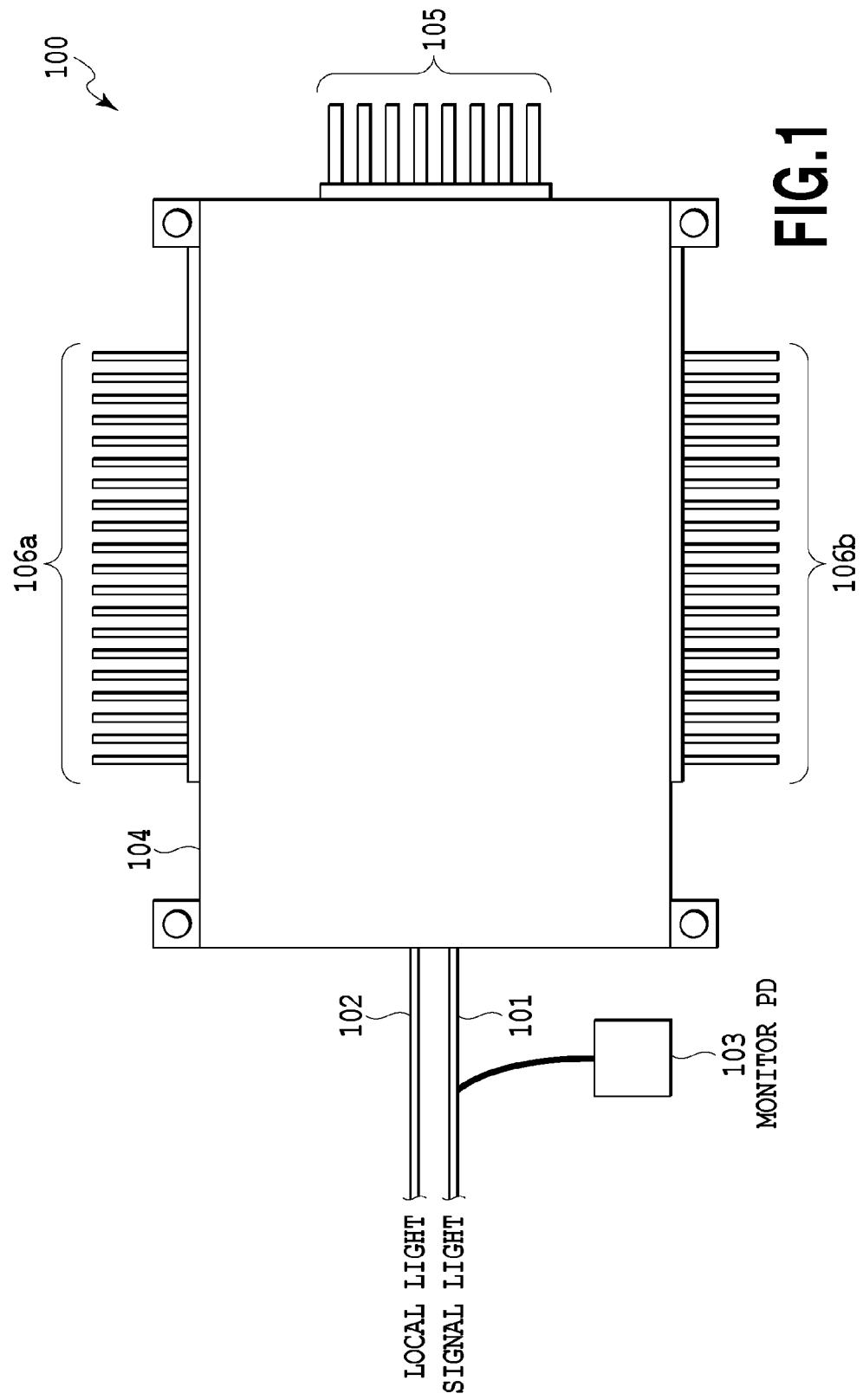
FIG. 1 is a diagram illustrating an exterior view of a conventional front-end module.
Figure 2:
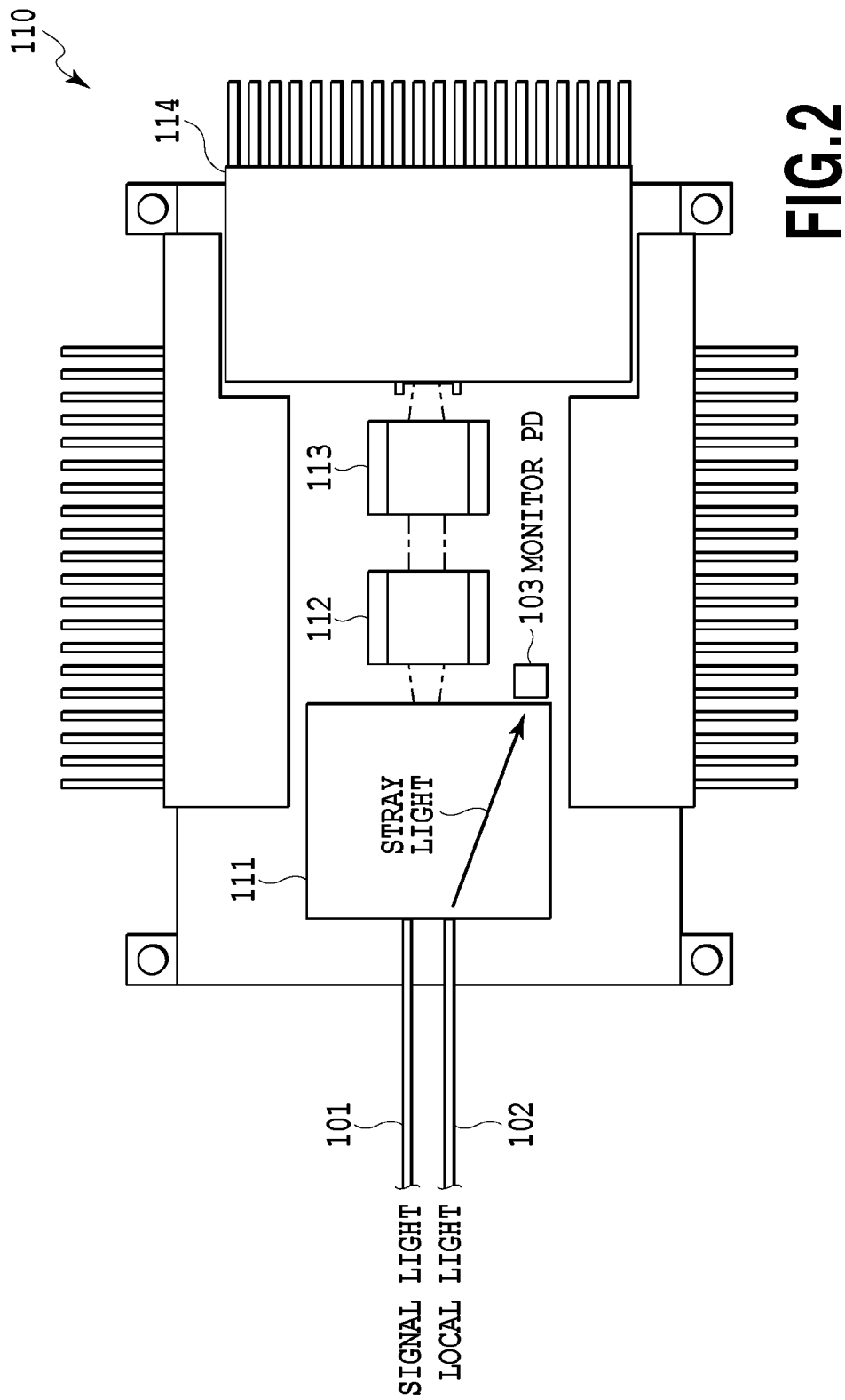
FIG. 2 is a diagram illustrating an exemplary configuration of a conventional front-end module.

Hereinafter, embodiments of the present invention will be described in detail. FIG. 5 is a diagram illustrating an exemplary configuration of an optical front-end module for a digital coherent receiver adopted as an optical module of the present invention. The front-end module 1 is equipped with two optical fibers 11 and 12, an optical signal processing circuit 13, lenses 14 and 15, a photodiode (PD) 16, an electrical wiring unit 17, a light shield member 18, and a monitor PD 19. The light shield member 18 includes an aperture unit. Note that although a DPOH is given as a specific example of the optical signal processing circuit 13 in the following description, the present invention is still applicable to the case of an optical signal processing circuit other than a DPOH, or an optical signal processing circuit that integrates optical circuits including a DPOH together with other optical signal processing functions.

In the DPOH 13, a clad layer 132 constituting an optical circuit is stacked on a substrate 131, with fixtures 133 and 135 additionally stacked on top of the clad layer 132 at the optical input end and the optical output end. The optical fibers 11 and 12 are aligned and fixed in place by a fiber block 134 that is made of a glass member. The optical fibers 11 and 12 are connected to the DPOH 13 at the edge of the fixture 133 and the fiber block 134 as well. This configuration improves the connection strength. The fixture 133 and the fiber block 134 are preferably realized with a material having a coefficient of thermal expansion close to that of the DPOH 13. For example, in the case where the DPOH 13 is realized with a silica-based PLC formed by stacking a core and clad layers made of silica glass on top of an Si substrate, the fixtures 133 and 135 as well as the fiber block 134 may also be realized with silica glass.

In the front-end module 1, signal light and LO light are respectively input from the two optical fibers 11 and 12. After that, the input signal light and LO light are subjected to optical signal processing by the DPOH 13. For example, the two input signals may be optically processed and output from the eight output ports as eight optical output signals. The optical circuit inside the DPOH 13 modifies the phase of the received signal light by interference with the LO light. The optical circuit inside the DPOH 13 then separates the signal light with modified phase, and outputs orthogonal components having a 90° phase difference. The optical signals output from the DPOH 13 are condensed by the lenses 14 and 15, and after being optoelectronically converted by the PD 16, are subjected to electrical signal processing in the electrical wiring unit 17 and output from the front-end module 1.

The circuit of the DPOH 13 is also configured to tap (divert) a portion of the signal light input from the optical fiber 11, and output the tapped portion from a given site on the input edge. A light shield member 18 having an aperture unit is provided surrounding this given site on the input edge of the DPOH 13. The light shield member 18 is provided spanning the substrate, clad layer, and fixture of the DPOH 13, with the aperture aligned with the optical path of the tapped signal light. The monitor PD 19 is disposed on the same edge as the optical input edge of the DPOH 13 so as to be optically connected to output light from the aperture of the light shield member 18 having an aperture unit, and able to sense the tapped signal light. By monitoring a portion of the signal light with the monitor PD 19, the received intensity of the signal light can be estimated, and the intensity of the LO light or the signal light can be controlled.

Figure 4A:
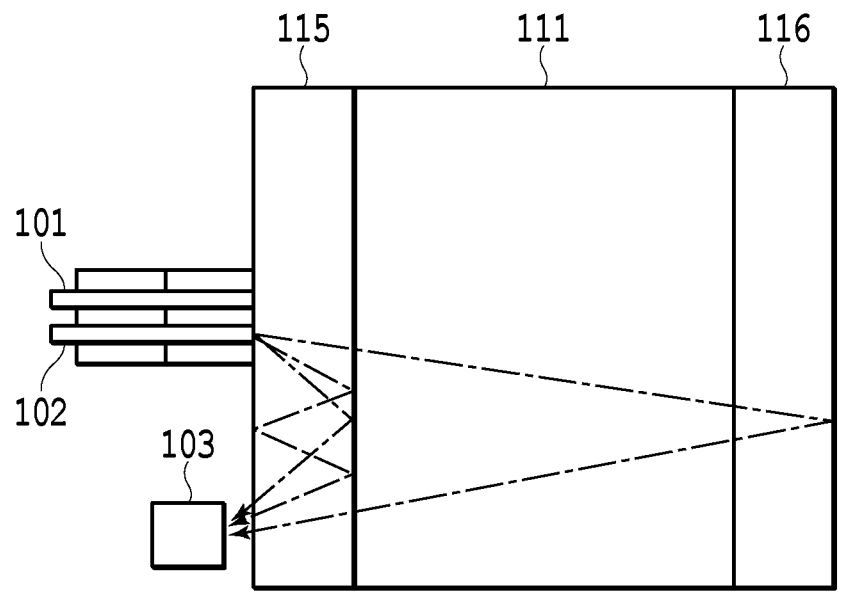
FIG. 4A is a top view of an optical signal processing circuit (DPOH) illustrating the problem of stray light.
Figure 4B:
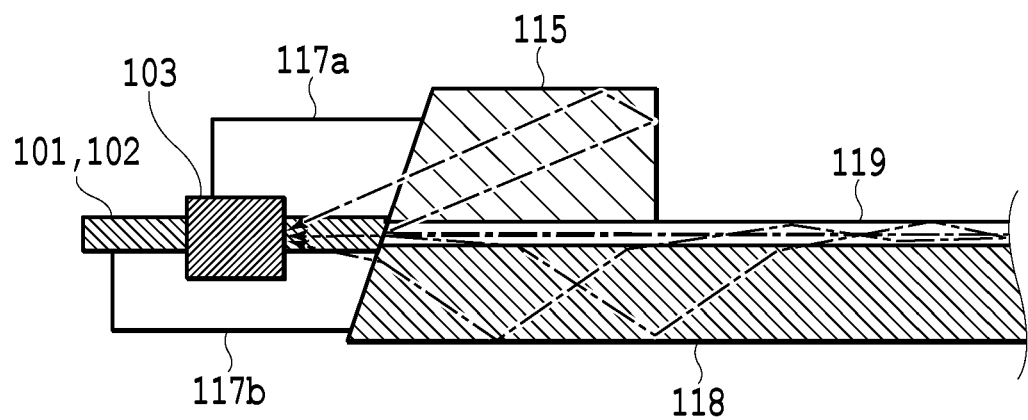
FIG. 4B is a cross-section view of an optical signal processing circuit (DPOH) illustrating the problem of stray light.

The inventors investigated stray light in the configuration in FIG. 3, and found the following. As illustrated in FIGS. 4A and 4B, stray light primarily 1) travels a path that reaches the monitor PD after being multiply reflected inside the fixture 115 provided in order to improve the connection strength between the optical fibers 101 and 102 and the DPOH 111, as well as the fiber block 117 which aligns and holds the optical fibers 101 and 102 at a given position while also aiding connection to the DPOH, and 2) travels a path that reaches the monitor PD 103 after propagating through the interior of the substrate 118 and the clad layer 119 by being repeatedly reflected between the bottom of the substrate 118 and the top of the clad layer 119, and turning back at the edge opposing the input end. Particularly, the inventors discovered the previously unexpected result that the path of the above 1) is an extremely large component because stray light reaches the monitor PD in the minimum distance, a discovery which led to the present invention.

In an optical module of the present invention, the configurations illustrated in the following embodiments prevent both the previously unexpected stray light traveling a path that reaches the monitor PD after being multiply reflected inside the fixture 133 (first stray light) as well as the stray light traveling a path that reaches the monitor PD 19 after propagating through the interior of the substrate 131 and the clad layer 132 by being repeatedly reflected between the bottom of the substrate 131 and the top of the clad layer 132, and turning back at the edge opposing the input end of the DPOH 13 (second stray light). Thus, the LO light 12 and the monitor PD 19 are sufficiently isolated, enabling precise monitoring of the signal light power.

Figure 6A:
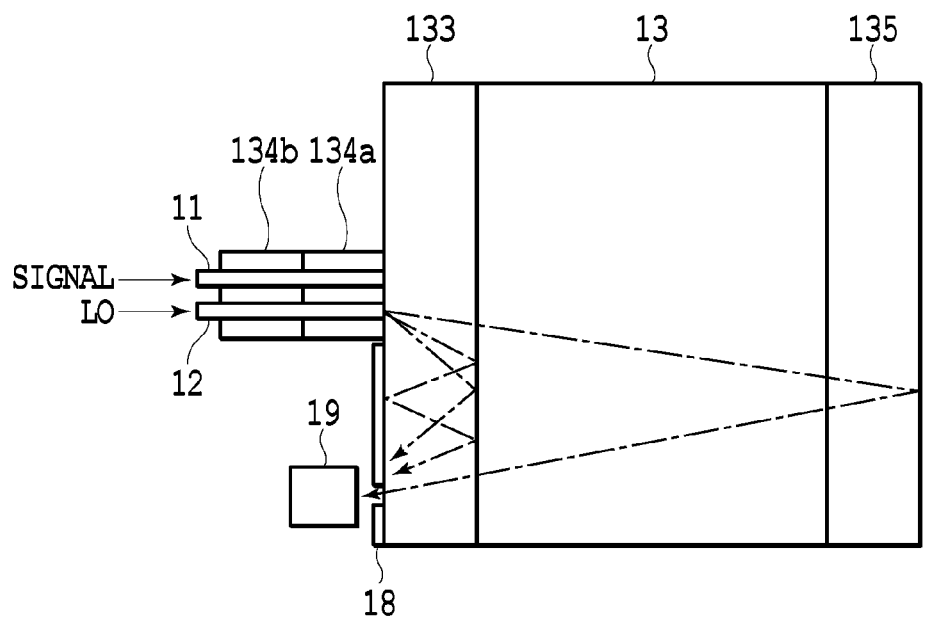
FIGS. 6A and 6B are diagrams illustrating an exemplary configuration of an optical module according to the first embodiment.
Figure 6B:
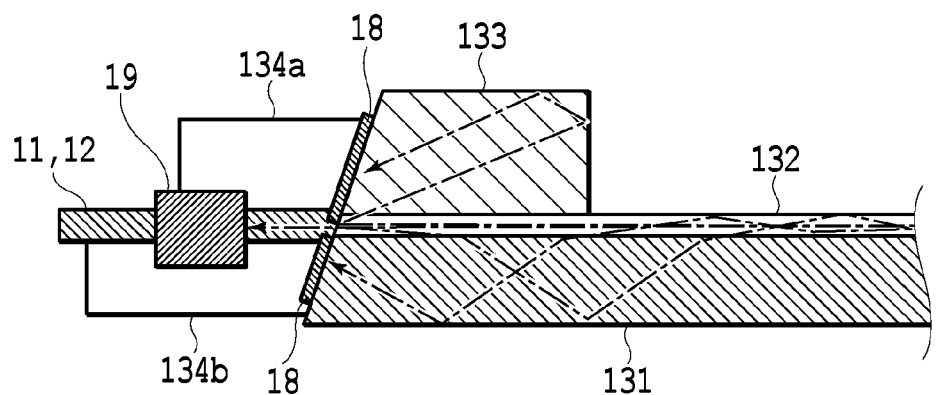

Specifically, as illustrated in FIGS. 6A and 6B, a light shield member 18 that includes an aperture unit spanning the fixture 133, the clad layer 132, and the substrate 131 is provided on the circuit edge of the DPOH 13 facing the monitor PD 19 (first embodiment). Additionally, using this configuration in combination with the embodiments in the following 1 to 4 may potentially further improve isolation between the LO light and the monitor PD. These configurations will be described as specific configurations separated into the following embodiments.

1) Embodiments applying an anti-reflective treatment on part of fixture glass reflecting stray light (second and third embodiments)
2) Embodiment applying an anti-reflective treatment on top face of cladding (fourth embodiment)
3) Embodiments imparting light-absorbing properties to Si substrate or bottom face of substrate (fifth and sixth embodiments)
4) Embodiment applying anti-reflective treatment to edge reflecting stray light on opposite side of optical input end of DPOH circuit (seventh embodiment)

First Embodiment

FIGS. 6A and 6B are diagrams illustrating the DPOH 13 portion of an optical module according to the first embodiment. FIG. 6A is a top view of the DPOH 13 portion. FIG. 6B is a cross-section view of the DPOH 13 portion. As illustrated in FIGS. 6A and 6B, an optical module according to the first embodiment is provided with a light shield member 18 including an aperture unit that spans the fixture 133, the clad layer 132, and the Si substrate 131 on the edge of the DPOH 13 facing the monitor PD 19, or in other words, the optical input edge. The light shield member 18 may adopt a pinhole or slit form, for example. For example, a pinhole can be provided by applying and patterning a carbon-containing light-absorbing resin on one face of a 300 μm-thick silica glass plate (the face opposite the face adjoining the DPOH 13), and pasting this silica glass plate to the circuit edge of the DPOH 13 using a UV adhesive. A highly reflective film may also be used instead of a carbon-containing light-absorbing resin. A highly reflective film or light-absorbing material may also be formed directly on the circuit edge of the DPOH 13 itself.

According to the first embodiment, stray light arriving from anywhere other than an aperture unit having a predetermined position can be blocked, thereby sufficiently isolating the LO light and the monitor PD to obtain an optical module capable of precisely monitoring the signal light power. Particularly, since high-intensity stray light components reach the monitor PD via a path through the fixture glass and Si substrate as discussed earlier, providing a light shield member spanning not only the optical waveguide layer but also the fixture and Si substrate enables effective shielding against stray light.

Second Embodiment

Figure 7A:
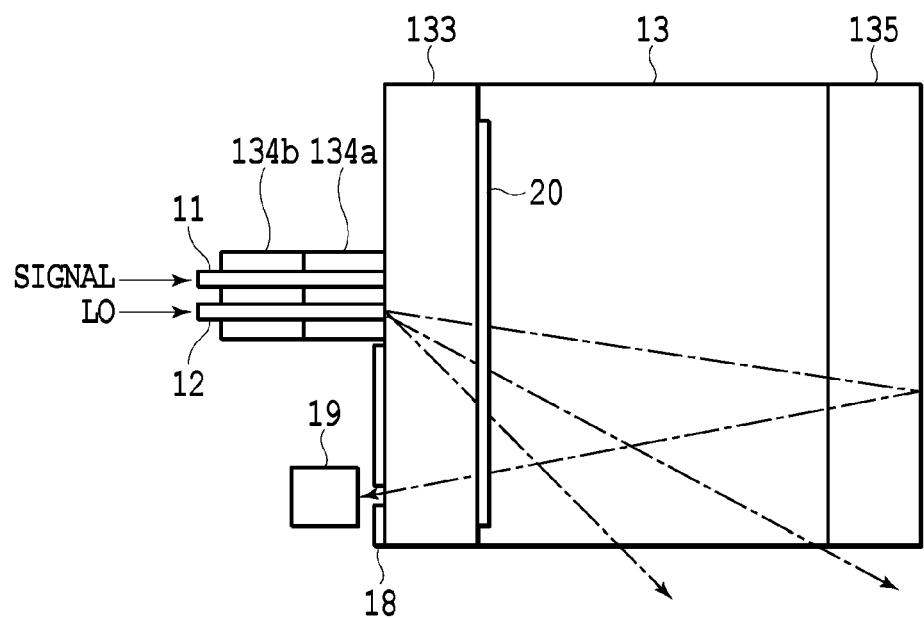
FIGS. 7A and 7B are diagrams illustrating an exemplary configuration of an optical module according to the second embodiment.
Figure 7B:
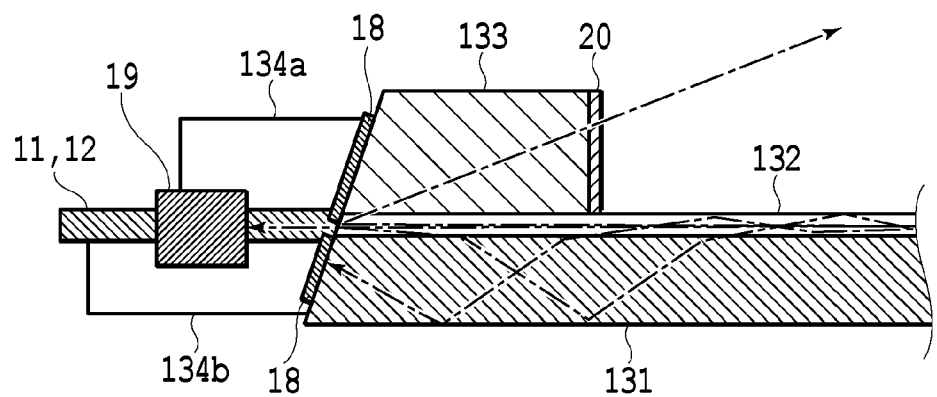

FIGS. 7A and 7B are diagrams illustrating the DPOH 13 portion of an optical module according to the second embodiment. FIG. 7A is a top view of the DPOH 13 portion. FIG. 7B is a cross-section view of the DPOH 13 portion. As illustrated in FIGS. 7A and 7B, an optical module according to the second embodiment is provided with an anti-reflective treatment section 20 where an anti-reflective treatment is applied to part of the fixture 133 that reflects stray light, in addition to the configuration of the first embodiment. An anti-reflective treatment refers to a treatment causing stray light to not return in the direction of reflection, and includes modes such as pasting an AR-coated silica glass plate or applying a light-absorbing black coating, for example. In the optical module according to the second embodiment, the anti-reflective treatment section 20, being an AR-coated silica glass plate, is pasted with a UV adhesive on the portion of the first point of reflection by the most intense stray light, or in other words, the edge of the fixture 133 facing the optical incidence end of the DPOH 13. The anti-reflective treatment section 20 may also be a glass plate coated with a light-absorbing material rather than an AR coat, and an AR film or light-absorbing material may also be directly formed on the fixture.

According to the second embodiment, the incident intensity of stray light onto the monitor PD due to multiple reflection is reduced, thereby further improving isolation between the LO light and the monitor PD to obtain an optical module capable of even more precisely monitoring the signal light power.

Third Embodiment

Figure 8A:
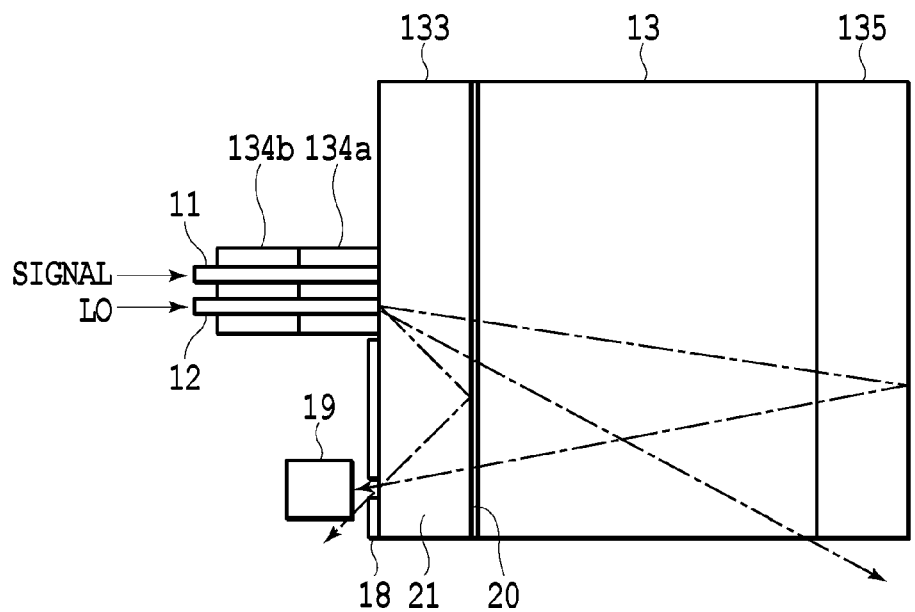
FIGS. 8A and 8B are diagrams illustrating an exemplary configuration of an optical module according to the third embodiment.
Figure 8B:
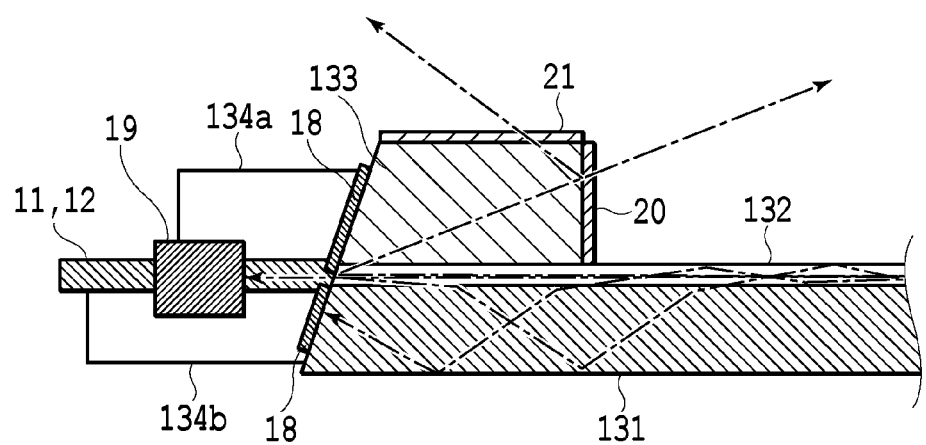

FIGS. 8A and 8B are diagrams illustrating the DPOH 13 portion of an optical module according to the third embodiment. FIG. 8A is a top view of the DPOH 13 portion. FIG. 8B is a cross-section view of the DPOH 13 portion. As illustrated in FIGS. 8A and 8B, an optical module according to the third embodiment is provided with an anti-reflective treatment section 21 where an AR coat is applied to the second plane of reflection in the fixture 133 (the top face) which differs from the first plane of reflection (the edge face of the fixture 133 facing the optical incidence end), in addition to the configuration of the second embodiment.

According to the second embodiment, the incident intensity of stray light onto the monitor PD due to multiple reflection is further reduced, thereby further improving isolation between the LO light and the monitor PD to obtain an optical module capable of even more precisely monitoring the signal light power.

Fourth Embodiment

Figure 9A:
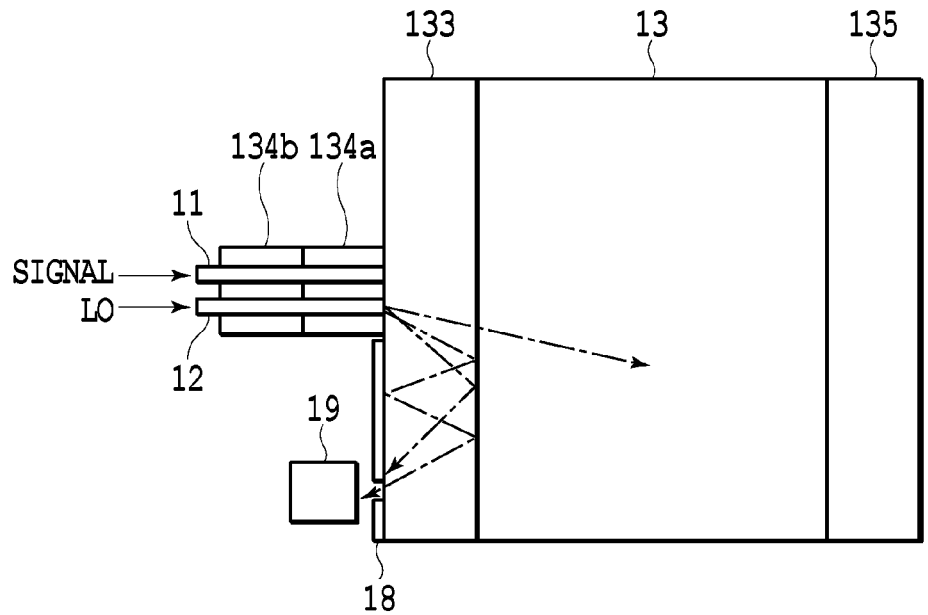
FIGS. 9A and 9B are diagrams illustrating an exemplary configuration of an optical module according to the fourth embodiment.
Figure 9B:
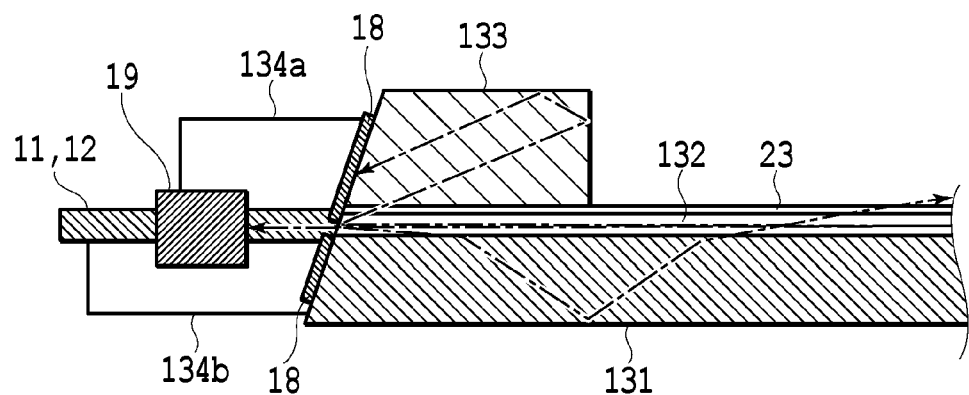

FIGS. 9A and 9B are diagrams illustrating the DPOH 13 portion of an optical module according to the fourth embodiment. FIG. 9A is a top view of the DPOH 13 portion. FIG. 9B is a cross-section view of the DPOH 13 portion. As illustrated in FIGS. 9A and 9B, an optical module according to the fourth embodiment is provided with an anti-reflective treatment section 23 where an anti-reflective treatment is applied to the top face of the clad layer 132, in addition to the configuration of the first embodiment.

According to the fourth embodiment, the stray light path due to multiple reflection between the bottom face of the Si substrate and the top face of the clad layer is eliminated, thereby further improving isolation between the LO light and the monitor PD to obtain an optical module capable of even more precisely monitoring the signal light power.

Fifth Embodiment

Figure 10A:
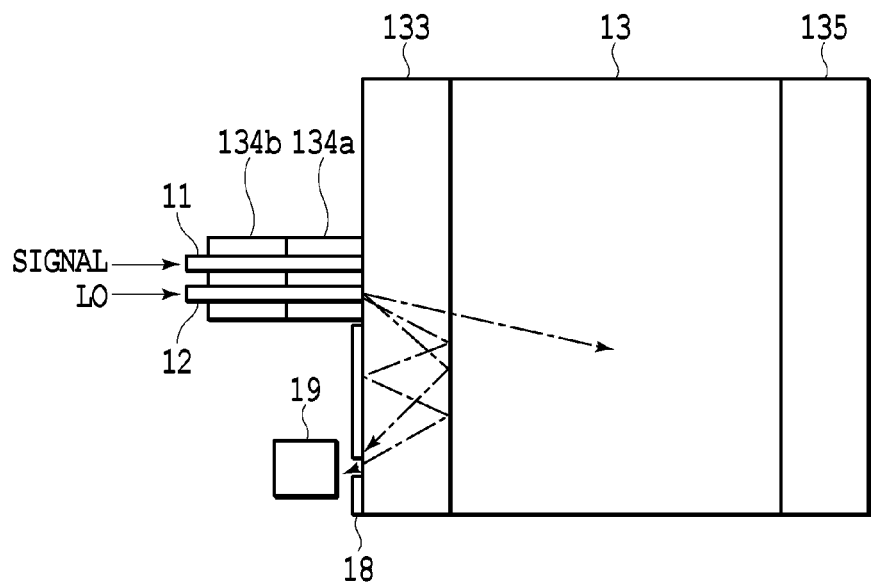
FIGS. 10A and 10B are diagrams illustrating an exemplary configuration of an optical module according to the fifth embodiment.
Figure 10B:
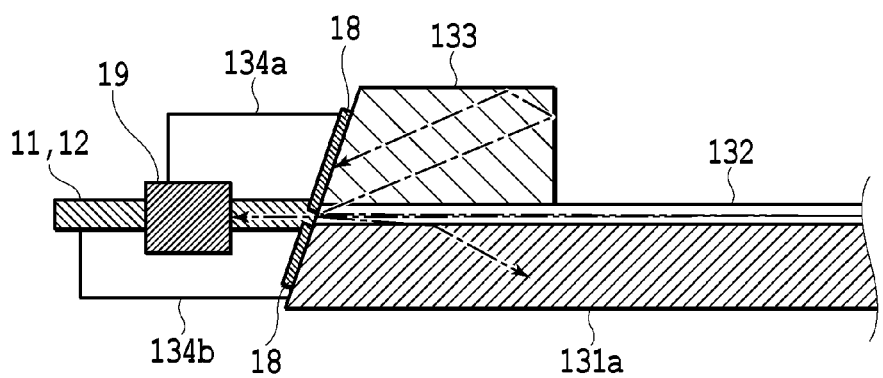

FIGS. 10A and 10B are diagrams illustrating the DPOH 13 portion of an optical module according to the fifth embodiment. FIG. 10A is a top view of the DPOH 13 portion. FIG. 10B is a cross-section view of the DPOH 13 portion. As illustrated in FIGS. 10A and 10B, an optical module according to the fifth embodiment uses a substrate 131a with light-absorbing properties imparted to the substrate, in addition to the configuration of the first embodiment. In this example, a low-resistance Si substrate is used as the substrate with imparted light-absorbing properties.

According to the fifth embodiment, stray light has a high attenuation rate and is unable to propagate over long distances due to the light-absorbing properties of the substrate in the low-resistance Si substrate, thereby effectively removing stray light. Thus, isolation between the LO light and the monitor PD is further improved to obtain an optical module capable of even more precisely monitoring the signal light power.

Sixth Embodiment

Figure 11A:
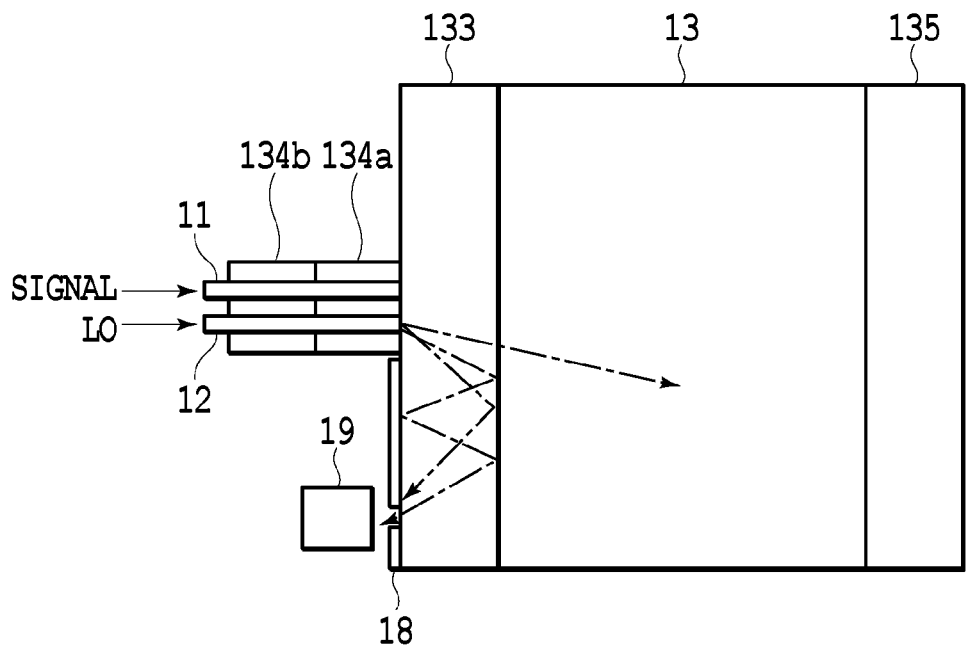
FIGS. 11A and 11B are diagrams illustrating an exemplary configuration of an optical module according to the sixth embodiment.
Figure 11B:
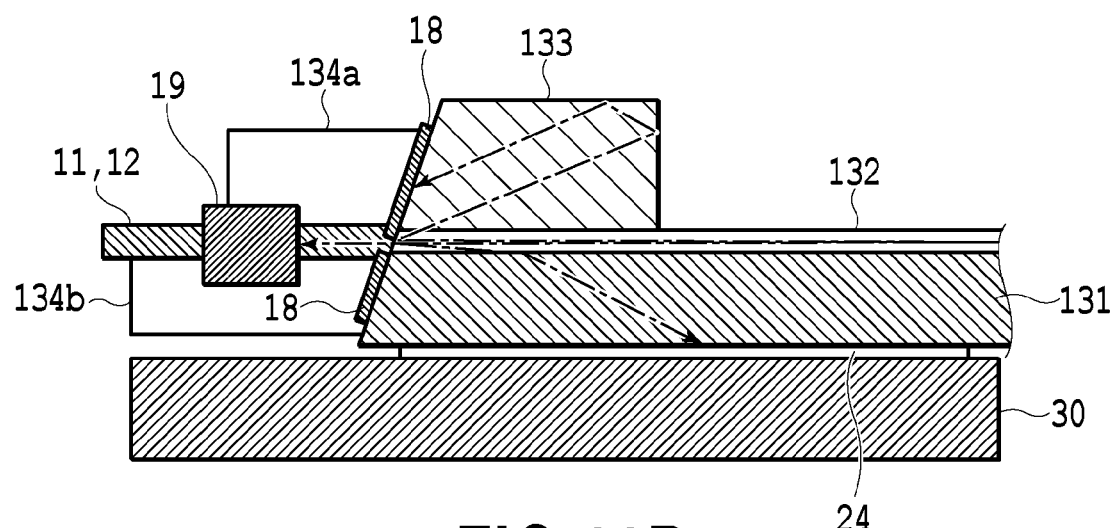

FIGS. 11A and 11B are diagrams illustrating the DPOH 13 portion of an optical module according to the sixth embodiment. FIG. 11A is a top view of the DPOH 13 portion. FIG. 11B is a cross-section view of the DPOH 13 portion. As illustrated in FIGS. 11A and 11B, an optical module according to the sixth embodiment is provided with a light-absorbing properties imparting section 24 that imparts light-absorbing properties to the bottom face of the substrate 131, in addition to the configuration of the first embodiment. The light-absorbing properties imparting section 24 may be realized by using a carbon-containing black adhesive when affixing the PLC to a metal mount, for example.

According to the sixth embodiment, the reflection ratio of the bottom face of the substrate is reduced, thereby further improving isolation between the LO light and the monitor PD to obtain an optical module capable of even more precisely monitoring the signal light power.

Seventh Embodiment

Figure 12A:
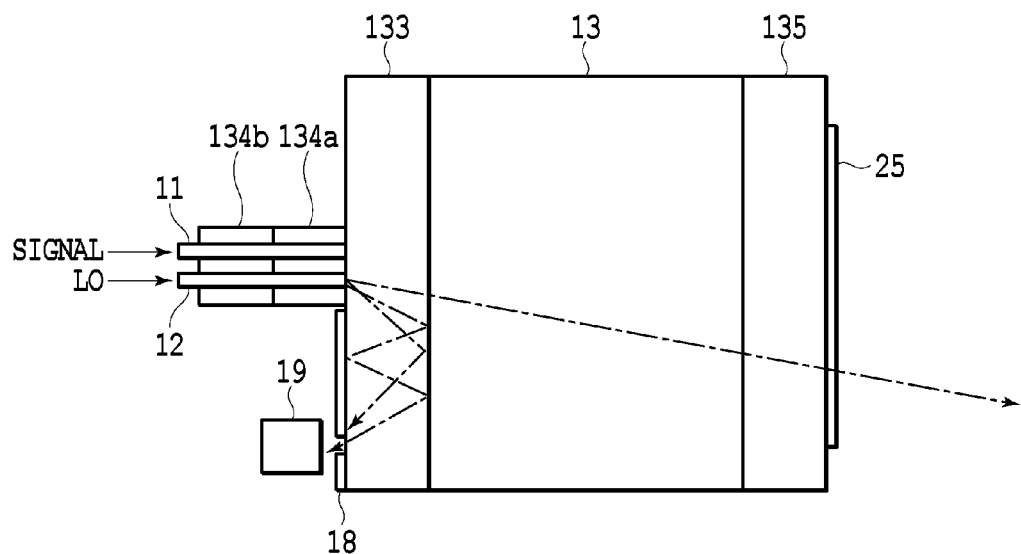
FIGS. 12A and 12B are diagrams illustrating an exemplary configuration of an optical module according to the seventh embodiment.
Figure 12B:
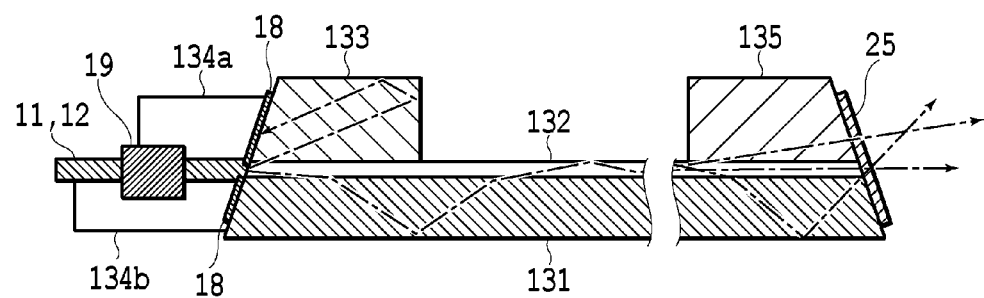

FIGS. 12A and 12B are diagrams illustrating the DPOH 13 portion of an optical module according to the seventh embodiment. FIG. 12A is a top view of the DPOH 13 portion. FIG. 12B is a cross-section view of the DPOH 13 portion. As illustrated in FIGS. 12A and 12B, an optical module according to the seventh embodiment is provided with an anti-reflective treatment section 25 where an anti-reflective treatment is applied to the edge face that reflects stray light on the opposite side of the optical input end of the DPOH 13, in addition to the configuration of the first embodiment. For example, the anti-reflective treatment section 25 may be provided by using UV adhesive to paste an AR-coated 300 μm-thick silica glass plate to the face opposite the face that faces the monitor PD 19, or in other words the output edge of the DPOH 13. Also, the anti-reflective treatment section 25 is preferably provided at a site positioned among the eight output ports of the DPOH 13. This is because stray light readily concentrates in the areas among the output ports.

According to the seventh embodiment, stray light reflecting off the output edge face of the DPOH is attenuated, thereby further improving isolation between the LO light and the monitor PD to obtain an optical module capable of even more precisely monitoring the signal light power.

The second to seventh embodiments described above may be respectively combined with each other to obtain an optical module capable of monitoring the signal light power with even higher precision.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An optical module for communication, comprising:
   two optical fibers that respectively input received signal light, and local light used to interfere with the signal light;
   an optical signal processing circuit, connected to the two optical fibers at one end, that causes the signal light and the local light input from the two optical fibers to interfere, and outputs the result from another end opposite the one end, and in addition, diverts a portion of the input signal light and outputs the diverted portion from a given site on the one end;
   a signal output unit that optoelectronically converts light output from the other end of the optical signal processing circuit, and outputs the result as one or more output signals; and
   a monitor PD, disposed on the light path of the signal light output from the given site on the one end of the optical signal processing circuit, that monitors the power of the diverted signal light;
   wherein the optical signal processing circuit includes a substrate, an optical waveguide layer made up of a core and a clad layer stacked on top of the substrate, and fixtures stacked on top of the clad layer on the one end, and is provided with alight shield member which spans the substrate, the clad layer, and the edge face of the fixture on the edge face of the optical signal processing circuit that faces the monitor PD, and which includes an aperture unit aligned with the given site where the diverted signal light is output.

2. The optical module according to claim 1, wherein an anti-reflective treatment section is provided on the edge face of the fixture that faces the optical input end of the optical signal processing circuit.

3. The optical module according to claim 1, wherein an anti-reflective treatment section is provided on the top face of the fixture.

4. The optical module according to claim 1, wherein an anti-reflective treatment section is provided on the top face of the clad layer.

5. The optical module according to claim 1, wherein light-absorbing properties are imparted to the substrate.

6. The optical module according to claim 1, wherein a light-absorbing properties imparting section is provided on the bottom face of the substrate.

7. The optical module according to claim 1, wherein an anti-reflective treatment section is provided on the output end of the optical signal processing circuit.

* * * * *